United States Patent Office 3,020,527
Patented Feb. 6, 1962

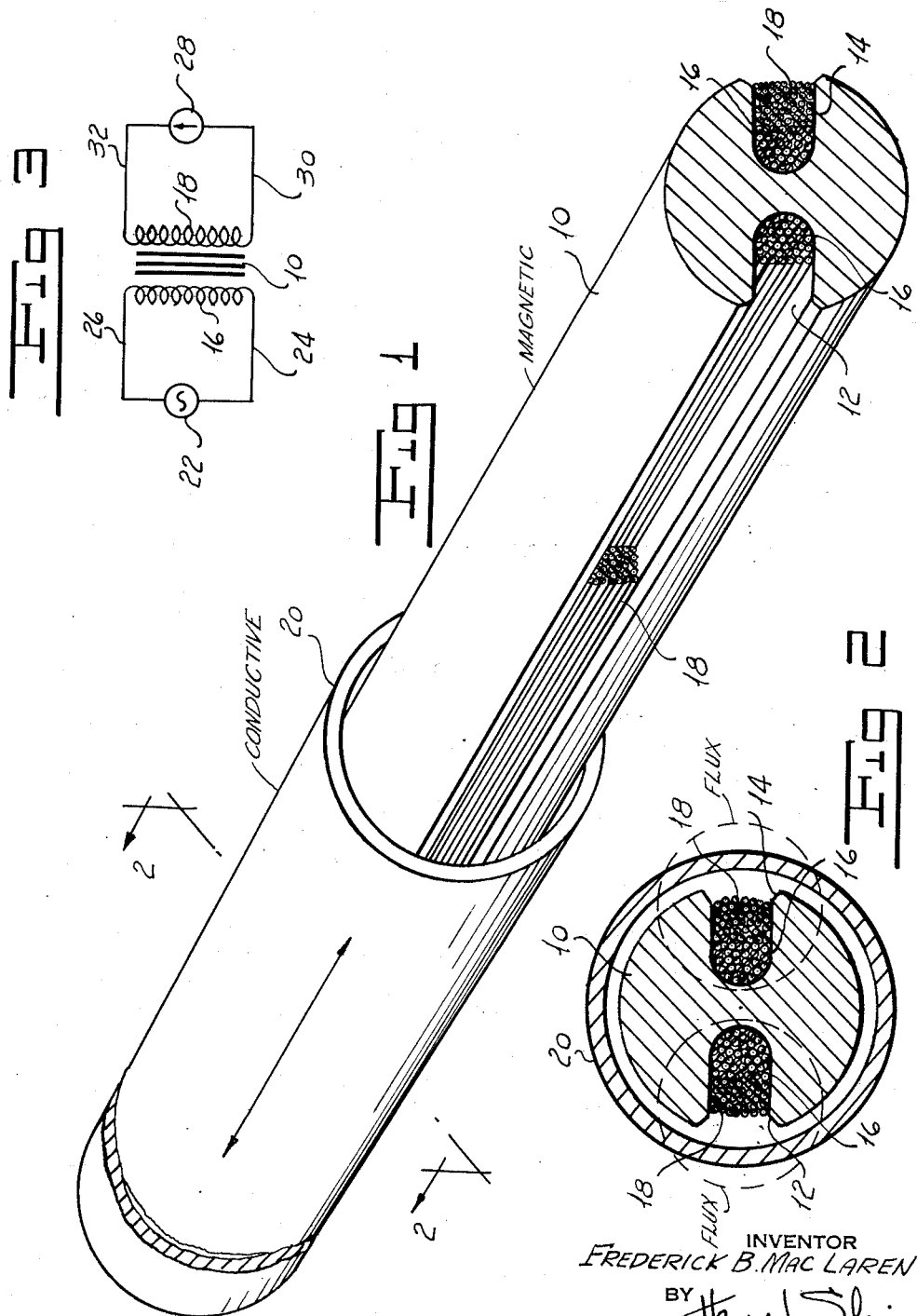

3,020,527
POSITION INDICATING SYSTEM
Frederick B. MacLaren, New York, N.Y., assignor, by mesne assignments, to United Aircraft Corporation, East Hartford, Conn., a corporation of Delaware
Filed May 13, 1957, Ser. No. 658,802
7 Claims. (Cl. 340—196)

My invention relates to a position indicating system and more particularly to a telemetric system for indicating the position of a remote or inaccessible means which may be moved to various positions in a simple, convenient, accurate, and reliable manner.

Telemetric systems and devices are well known to the prior art. Generally they are cumbersome and expensive.

One object of my invention is to provide a position indicating system which will indicate the position of a device at a location remote from the movable device in a simple, convenient and accurate manner.

Another object of my invention is to provide an alternating current position indicating system which employs single-phase, alternating current.

A further object of my invention is to provide a telemetric system which may be employed expeditiously with an elongated tube, which tube may act as a pressure wall.

Other and further objects of my invention will appear from the following description.

In general my invention contemplates the provision of an elongated core having a generally H-shaped cross-sectional area. The core may advantageously be made of paramagnetic or ferromagnetic material. A pair of windings are wound around the core in loops, the common axis of which extends at right angles to the longitudinal axis of the core. One of the windings forms a primary winding and is placed across a source of single-phase, alternating current potential. The other of the windings forms the secondary winding and is placed across an alternating current voltmeter.

The elongated core and the windings are adapted to be housed in a shield formed of a good conductor such as copper or the like. In any relative position of the core and shield, the voltage delivered to the voltmeter is the secondary winding induced voltage less the voltage drop in the secondary winding owing to the voltmeter current. This latter voltage usually is so small that it can be neglected. If desired, the secondary voltage drop owing to voltmeter current can be calibrated out since it is proportional to the indicated voltage. The secondary winding induced voltage is substantially equal to the primary winding counter electromotive force because of the very close coupling between the windings. The input voltage to the primary winding equals the primary winding counter electromotive force plus the primary winding voltage drop owing to the exciting and load currents. As the shield is moved from a position clear of the core to a position over the core, the load current increases as the short circuit currents induced in the shield increase. As the load current increases the primary winding voltage drop increases and, in the presence of an input signal of constant value, the secondary winding induced voltage decreases. By keeping the exciting current low, by using a small air gap, and by using a large number of turns I am able to produce a secondary winding induced voltage which changes very nearly linearly with change in shield position. The voltmeter can be calibrated to indicate the position of the core and winding assembly with respect to the shield at a remote point in any predetermined desired units of linear measurement.

In the accompanying drawings which form part of the instant specification and which are to be read in conjunction therewith and in which like reference numerals are used to indicate like parts in the various views:

FIGURE 1 is a perspective view of my position indicating system with parts broken away and parts in section.

FIGURE 2 is a sectional view taken along the line 2—2 of FIGURE 1.

FIGURE 3 is a diagrammatic view showing the electrical circuits involved in my position indicating system.

More particularly referring now to the drawings, a core 10, which takes the form of an elongated rod having a generally H-shaped cross section, is formed of paramagnetic material of any appropriate type. It will be seen that the core is provided with a pair of slots 12 and 14 extending generally longitudinally of the axis of the core 10. A primary winding 16 is positioned in slots 12 and 14 of the core 10 with each of the loops of the winding extending around an axis perpendicular to the longitudinal axis of the core 10. A secondary winding 18 is positioned over the primary winding and disposed within the slots 12 and 14. The loops of the secondary winding are likewise wound around an axis perpendicular to the longitudinal axis of the core 10. The axis of winding 18 is substantially coaxial with the axis of the winding 16.

An elongated shield 20 of conducting material has a length substantially equal to the length of the core 10. Advantageously, the shield 20 may be made out of copper or any other good conducting material. The shield may conveniently take the form of a tube, which tube may be a pressure tube. The pressure exercised upon the wall of tube 20 may be either inside the tube or external thereto, depending on the employment of the assembly. In order to avoid excessive changes in the voltmeter reading with changes in temperature preferably I wind the primary coil 16 from wire having a low temperature coefficient of resistance. If desired, I may compensate my device for changes in resistance with changes in temperature by correcting a thermistor (not shown) having a negative temperature coefficient of resistance in series with winding 16.

Referring now to FIGURE 3, it will be seen that I provide a single-phase, alternating current voltage source 22, the output of which is adapted to be impressed across the primary winding 16 by a pair of conductors 24 and 26. A galvanometer such as an alternating current voltmeter 28 is connected across winding 18 by conductors 30 and 32.

When the primary winding 16 is energized, magnetic flux linking the primary winding 16 and the secondary winding 18 will induce a voltage in the secondary winding 18. This voltage is measured by the voltmeter 28 and represents at its maximum a condition in which the core and winding assembly is completely removed outside of the shield 20. In practice this extreme condition will rarely obtain.

When the core 10 and its windings are completely shielded by the tube 20, magnetic flux will thread the shield 20 as can readily be seen by reference to FIGURE 2. The magnetic flux threading the shield will produce eddy currents in the shield. These eddy currents will provide magnetic fields to induce voltages in the secondary winding 18 in a direction to buck or oppose the voltages induced in the secondary winding by the magnetic flux threading the winding owing to current flowing in the primary winding.

It will be seen that when the core and winding assembly is completely housed or telescoped within the shield 20, the voltage across the secondary winding 18 will be at its minimum value. At this point the galvanometer 28 can be calibrated to a zero position. As the core assembly is moved out of the shield 20, the eddy current induced in the shield will become progressively less with the result that the voltage induced in the secondary winding 18 will become progressively greater. In this manner, the voltage across the secondary winding can be measured to indicate the linear position of the core 10 with respect to the shield or tube 20.

My device can be made quite accurate owing to the use of a single-phase, alternating-current source by a simple volatge regulator and frequency control means (not shown since they are well known to the art).

It will be seen that I have accomplished the objects of my invention. I have provided a position indicating system which will indicate the position of a device at a location remote from the movable device in a simple, convenient and accurate manner. My position indicating system employs single-phase, alternating current. The arrangement of my position indicating system is such that it may be expeditiously employed with an elongated tube which may at once act as a pressure wall.

It will be understood that certain features and subcombinations are of utility and may be employed without reference to other features and subcombinations. This is contemplated by and is within the scope of my claims. It is further obvious that vairous changes may be made in details within the scope of my claims without departing from the spirit of my invention. It is, therefore, to be understood that my invention is not to be limited to the specific details shown and described.

Having thus described my invention, what I claim is:

1. A electrical position transducer including in combination a longitudinally extending paramagnetic core formed with a pair of longitudinally extending winding-receiving slots, a primary winding disposed in said slots, a secondary winding disposed in said slots, a longitudinally extending sheath formed of conductive material surrounding the paramagnetic core, means for impressing an electrical input signal upon the primary winding, means for longitudinally varying the relative position of the paramagnetic core and conductive sheath, and means for obtaining from the secondary winding an electrical output signal indicative of relative position of the core and the sheath.

2. An electrical postion transducer including in combination a longitudinally extending ferromagnetic core provided with a pair of longitudinally extending winding-receiving slots, a primary winding wound in the bottom of the slots, a secondary winding wound over the primary winding, a longitudinally extending metallic conductive sheath surrounding the ferromagnetic core, means for impressing an electrical input signal upon the primary winding, means for longitudinally varying the relative position of the ferromagnetic core and the conductive sheath and means for obtaining from the secondary winding an electrical output signal indicative of relative position of the core and the sheath.

3. An electrical position transducer as in claim 2 in which said ferromagnetic core is provided with a generally H-shaped cross-sectional form.

4. An electrical position transducer as in claim 2 in which said electrical input signal comprises a single-phase alternating current potential.

5. An electrical position transducer as in claim 2 in which said output signal comprises an alternating current potential, and means for measuring said potential as indicative of the relative position being indicated.

6. An electrical position transducer as in claim 2 in which said primary winding and said secondary winding are coaxial.

7. An electrical position transducer including in combination an elongated core formed of paramagnetic material and having a longitudinal axis, a primary winding having an axis, a secondary winding having an axis, means mounting said primary and secondary windings in inductive relationship on said core with their axes extending in a direction substantially perpendicular to said core axis, an elongated sheath formed of conductive material surrounding said core and said windings, means for impressing an electrical input signal upon the primary winding, means for varying the relative position of said core and said sheath in the direction of the length of said core and means for obtaining from the secondary winding an electrical output signal indicative of the relative position of the core and sheath.

References Cited in the file of this patent

UNITED STATES PATENTS

| | | |
|---|---|---|
| 1,331,065 | Herz | Feb. 17, 1920 |
| 1,528,686 | Neumann | Mar. 3, 1925 |
| 2,430,757 | Conrad et al. | Nov. 11, 1947 |
| 2,450,192 | Freeman | Sept. 28, 1948 |
| 2,483,994 | Davis | Oct. 4, 1949 |
| 2,509,210 | Clark | May 30, 1950 |
| 2,598,810 | Lyman | June 3, 1952 |
| 2,606,315 | DeTar | Aug. 5, 1952 |

FOREIGN PATENTS

| | | |
|---|---|---|
| 1,020 | Great Britain | Feb. 24, 1883 |
| 737,882 | Germany | June 24, 1943 |